(12) United States Patent
Carlstedt et al.

(10) Patent No.: US 6,811,166 B2
(45) Date of Patent: Nov. 2, 2004

(54) CLUTCHED STABILIZER BAR

(75) Inventors: Robert P. Carlstedt, Rochester Hills, MI (US); James B. Chamberlin, Charlotte, NC (US); Ragnar H. Ledesma, Sterling Heights, MI (US); Nancy L. Saxon, Oakland Township, MI (US); Dennis A. Kramer, Troy, MI (US); Doyle R. Downey, Beverly Hills, MI (US); Joseph Cubalchini, St. Charles, IL (US); Monte G. Williams, Royal Oak, MI (US)

(73) Assignee: Meritor Light Vehicle Technology, LLC, Troy, MI (US)

(*) Notice: Subject to any disclaimer, the term of this patent is extended or adjusted under 35 U.S.C. 154(b) by 36 days.

(21) Appl. No.: 10/024,171

(22) Filed: Dec. 18, 2001

(65) Prior Publication Data

US 2003/0111816 A1 Jun. 19, 2003

(51) Int. Cl.$^7$ ................................................ B60G 3/02
(52) U.S. Cl. ............................... 280/124.152; 267/277; 188/293; 192/58.42
(58) Field of Search ............... 280/124.106, 124.107, 280/124.13, 124.152, 124.166, 5.506, 5.507, 5.508, 5.511; 267/277, 154; 188/293, 294, 306, 308, 310; 192/58.42

(56) References Cited

U.S. PATENT DOCUMENTS

| | | | |
|---|---|---|---|
| 3,085,817 A | * 4/1963 | Krause et al. | ........... 280/5.508 |
| 4,503,952 A | * 3/1985 | Hesse | ........... 188/306 |
| 4,589,678 A | 5/1986 | Lund | |
| 4,796,911 A | 1/1989 | Kuroki et al. | |
| 4,796,991 A | 1/1989 | Gordon et al. | |
| 4,805,929 A | 2/1989 | Shibata et al. | |
| 4,919,444 A | * 4/1990 | Leiber et al. | ........... 280/5.511 |
| 4,973,077 A | 11/1990 | Kuwayama et al. | |
| 5,288,101 A | 2/1994 | Minnett | |
| 6,022,030 A | 2/2000 | Fehring | |
| 6,149,166 A | 11/2000 | Struss et al. | |
| 6,305,487 B1 | * 10/2001 | Montague | ........... 180/350 |
| 6,428,019 B1 | * 8/2002 | Kincad et al. | ........... 280/5.511 |
| 6,481,732 B1 | * 11/2002 | Hawkins et al. | ...... 280/124.106 |

* cited by examiner

Primary Examiner—Faye M. Fleming
(74) Attorney, Agent, or Firm—Carlson, Gaskey & Olds

(57) ABSTRACT

A clutch device for use with a vehicle suspension system to vary the stiffness of a stabilizer bar. A plurality of dampers connected to the clutch body alternate with a plurality of dampers connected to the stabilizer bar. The dampers are coated with a friction material and surrounded by a fluid. When a load is applied on the walls of clutch body, the friction material comes into contact, dampening the rotation action of the stabilizer bar. A sensor senses the parameters of the ride and generates a signal based on these parameters. The signal activates a power source controller which applies the load to the walls.

21 Claims, 4 Drawing Sheets

CLUTCHED STABILIZER BAR

BACKGROUND OF THE INVENTION

The present invention relates generally to an active clutch device utilized on a stabilizer bar of a vehicle suspension system which includes a plurality of interacting dampers which provide variable stiffness in the stabilizer bar.

Vehicles are commonly equipped with suspension systems for absorbing road shock and other vibrations, while providing for a smooth and comfortable ride. Also tipping or rolling over of vehicles is undesirable. A suspension component, such as a stabilizer bar, is often used to increase roll rigidity and improve the steering stability of the vehicle. The stabilizer bar is generally attached to the lower A-arms of the suspension system and controls sway as the vehicle turns and provides a pull down force during cornering.

As a vehicle turns, the body of the vehicle rolls to the outside of the turn. The suspension components on the outside of the turn are generally compressed, while the suspension components on the inside of the turn are generally extended. The stabilizer bar counters this motion by pushing up on the suspension components collapsed through torsion in the stabilizer bar.

During cornering, it is desirable that the stiffness of the stabilizer bar be increased. If the stabilizer bar is too compliant, the vehicle will not respond well during cornering, increasing the likelihood of rolling over. However, if the stabilizer is too stiff, the ride and handling will be compromised during normal vehicle operation. Therefore, it is desirable that the compliance of the stabilizer bar be variable to adjust for changing driving conditions.

In a proposed vehicle suspension system, a clutch device includes a chamber which houses a plurality of discs and either a magnetic-rheological or electro-rheological fluid. On the application of either a high strength magnetic or electrical field, respectively, the fluid increases in viscosity, which increases both the stiffness of the stabilizer bar and the ride of the vehicle. In this system, the discs are attached to a pair of split stabilizer bars, the discs selectively driving each other.

SUMMARY OF THE INVENTION

This invention relates to an active clutch device for use on a stabilizer bar of a vehicle suspension system to provide variable stiffness in the stabilizer bar.

A clutch device positioned in the middle of a split stabilizer bar is employed to vary the stabilizer bar stiffness. A clutch body secured to the vehicle frame includes a plurality of clutch dampers which alternate with a plurality of bar dampers which are secured to the stabilizer bar. The alternating dampers are coated with a friction material and surrounded with a fluid enclosed in the clutch body by walls. When a load is applied on the walls, the walls pressing the friction material together to dampen the rotational action of the stabilizer bar. The walls are secured to the clutch body and the stabilizer bar by a sliding component, such as an annular elastic bead, which allows for the slight movement of the walls.

A sensor senses the ride parameters and generates a signal based on these parameters. When the vehicle corners and the sensor detects a need for an increase in vehicle roll stiffness, the sensor generates a signal which activates a power source controller. The controller proportionally applies the load to the walls, proportionally dampening the stabilizer bar. The load can be applied from a hydraulic, pneumatic, or electrical power source. Alternatively, the load can be applied by applying a magnetic or electrical field to magnetic-rheological or electro-rheological fluid, respectively, in the clutch body.

Accordingly, the present invention provides an active clutch device for use on a stabilizer bar of a vehicle suspension system to provide variable stiffness in the stabilizer bar.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
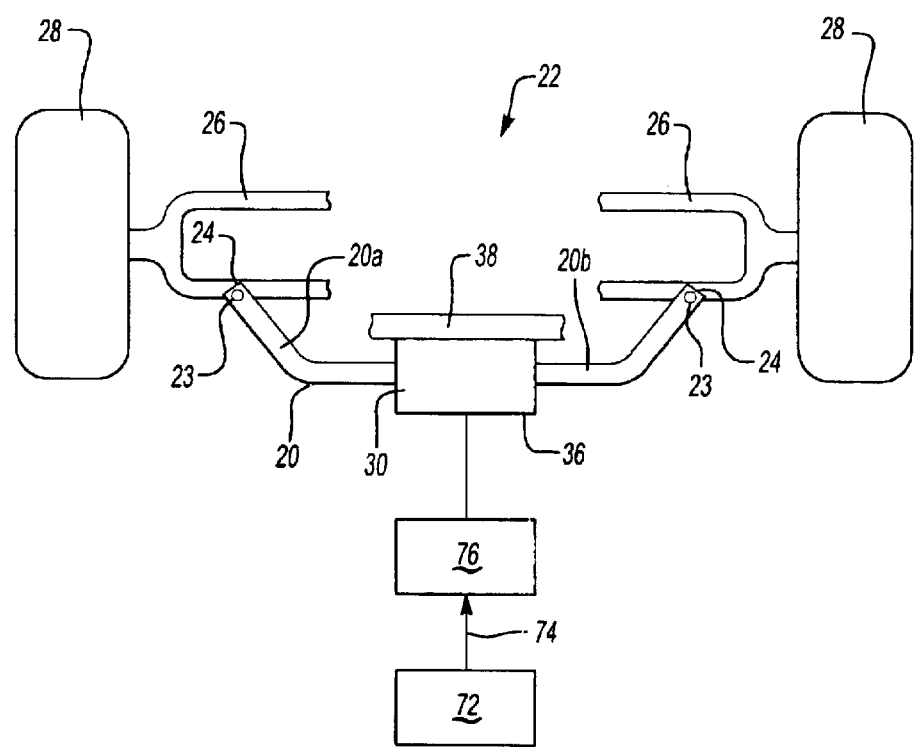
FIG. 1 illustrates a front schematic view of a stabilizer bar of the present invention employed in a vehicle suspension system.

FIG. 1 illustrates a stabilizer bar 20 of a vehicle suspension system 22. As shown schematically, ends 24 of the stabilizer bar 20 are attached by linkages 23 to control arms 26 which are mounted to wheels 28. As known, the stabilizer bar 20 provides a stabilizer function.

Figure 2:
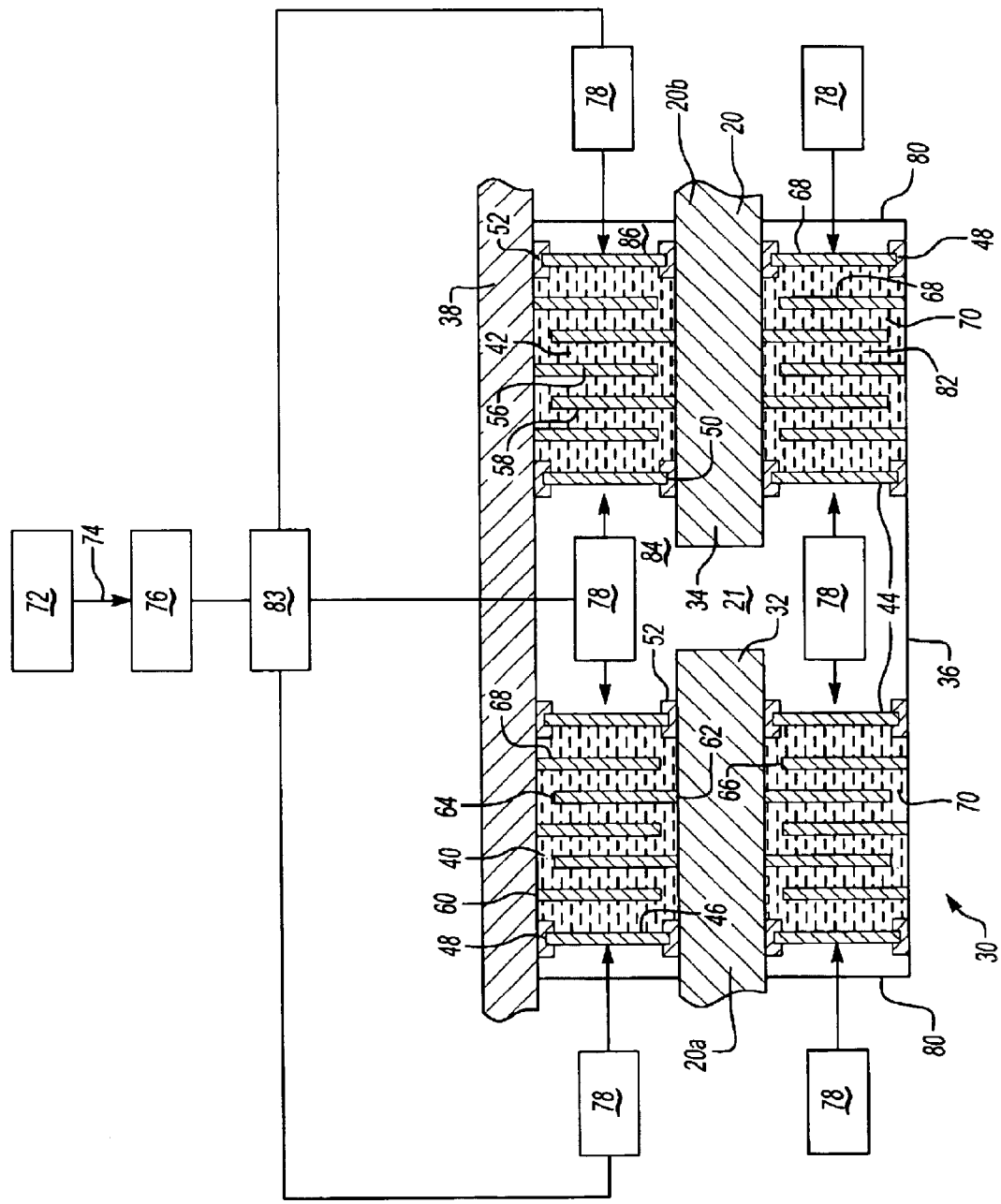
FIG. 2 illustrates a front cross-sectional view of the clutch device of the present invention utilizing a hydraulic or pneumatic load source.

As shown in FIG. 2, The stabilizer bar 20 of the present invention is equally split to form a left stabilizer bar portion 20a and a right stabilizer bar portion 20b, a division 21 located between the portions 20a and 20b. A clutch device 30 receives inner portions 32 and 34, respectively, of stabilizer bar portions 20a and 20b.

The clutch device 30 includes a clutch body 36 which is attached to a vehicle frame 38, shown schematically. The clutch body 36 is split into a left compartment 40 and right compartment 42 which receive the inner portions 32 and 34, respectively, of the stabilizer bar 20. Each compartment 40 and 42 is formed and enclosed by an inner wall 44 and an outer wall 46, each wall 44 and 46 including an outer periphery 48 and an inner periphery 50. The outer peripheries 48 are substantially sized and shaped to fit the clutch body 36, and the inner peripheries 50 arc substantially sized, shaped and aligned to receive the inner portions 32 and 34 of the stabilizer bar 20a and 20b, respectively.

A flexible component 52 seals the outer peripheries 48 of the walls 44 and 46 to the clutch body 36 and the inner peripheries 50 to the stabilizer bar portions 20a and 20b. As the components 52 are slightly flexible, the components 52 allow for slight movement of the walls 44 and 46. In the preferred embodiment, the components 52 and 54 are a flexible elastic annular bead or a diaphragm.

A plurality of clutch dampens 56 and a plurality of stabilizer bar dampers 58 are alternatingly connected to the clutch body 36 and the stabilizer bar portions 20a and 20b, respectively. Although six clutch dampers 56 and four stabilizer bar dampers 58 are illustrated, any number of dampers 56 and 58 can be utilized. It is preferred that the dampers 56 and 58 are substantially perpendicular to the stabilizer bar 20. The outer periphery 60 of each of the clutch dampers 56 is secured to the clutch body 36, and the inner periphery 62 of each of the stabilizer bar dampers 58 is secured to the stabilizer bar portions 20a and 20b. The dampers 56 and 58 are slightly flexibly secured such that slight movement is possible. An inner periphery 64 of the clutch dampers 56 and an outer periphery 66 of the stabilizer bar dampers 58 are unsecured.

Friction material 68 in positioned substantially between each of the walls 44 and 46 and the dampers 56 and 58. It is preferred that the friction material 68 be coated on the walls 44 and 46 and the dampers 56 and 58. During normal vehicle operation when the stabilizer bar 20 is in a relatively unstiffened state, a slight gap 82 exists between the friction material 68. As the gap 82 is substantially narrow, the frictional material 68 almost engages the other friction material 68 when the stabilizer bar 20 is in the unstiffened state. However, for illustrative purposes, the gaps 82 in FIG. 2 between the friction material 68 are shown enlarged and not to scale.

A fluid 70 in each compartment 40 and 42 substantially surrounds the friction material 68 to dissipate heat and increase the freedom of movement between the friction material 68. The fluid 70 is retained in the compartments 40 and 42 by the walls 44 and 46 and is sealed by the flexible components 52.

During vehicle operation, a sensor 72 detects a ride parameter, such as lateral acceleration, wheel load, wheel velocity or yaw rate. When the sensor 72 detects an increase in the rotation of the stabilizer bar 20, the sensor 72 generates and forwards a signal 74 to a power source controller 76. The controller 76 applies a load 78 on walls 44 and 46 which corresponds to the signal 74 generated. In this embodiment the load 78 is applied through fluid pressure. One skilled in the art would understand what ride parameters would need to be detected to determine the desired stiffness of the stabilizer bar 20.

During normal vehicle operation when the stabilizer bar 20 is in a relatively unstiffened state, the slight gap 82 exists between the friction materials 68. When the sensor 72 detects a need for an increase in stiffness, a signal 74 is sent to the power source controller 76. The controller 76 applies the load 78 to the walls 44 and 46 which are slightly pressed inwardly towards the dampers 56 and 58. As the dampers 56 and 58 are flexibly connected to the clutch body 36 and the stabilizer bar 20, the friction materials 68 are brought into contact, stiffening the stabilizer bar 20. When the sensor 72 detects a need for a decrease in the stiffness of the stabilizer bar 20, a signal 74 is generated to slightly move the walls 44 and 46 outwardly away from the dumpers 56 and 58. The friction materials 68 disengage, reducing stiffness in the stabilizer bar 20.

As further illustrated in FIG. 2, the controller 76 activates a hydraulic or pneumatic source 83 to generate the load 78. The source 83 injects a pressurized fluid into a middle section 84 located between the inner walls 44 and into outer sections 86 created between the outer walls 46 and sealing walls 80 fixed to the clutch body 36. The fluid may be hydraulic or air. When the fluid or air enters the middle section 84 and the outer sections 86, the fluid or air presses on the outer walls 46 and the inner walls 44, creating the load 78 and pressing the friction materials 68 into contact to stiffen the stabilizer bar 20. The valving etc. to selectively control the application of this pressurized fluid is within the skill of a worker in this art.

Figure 3:
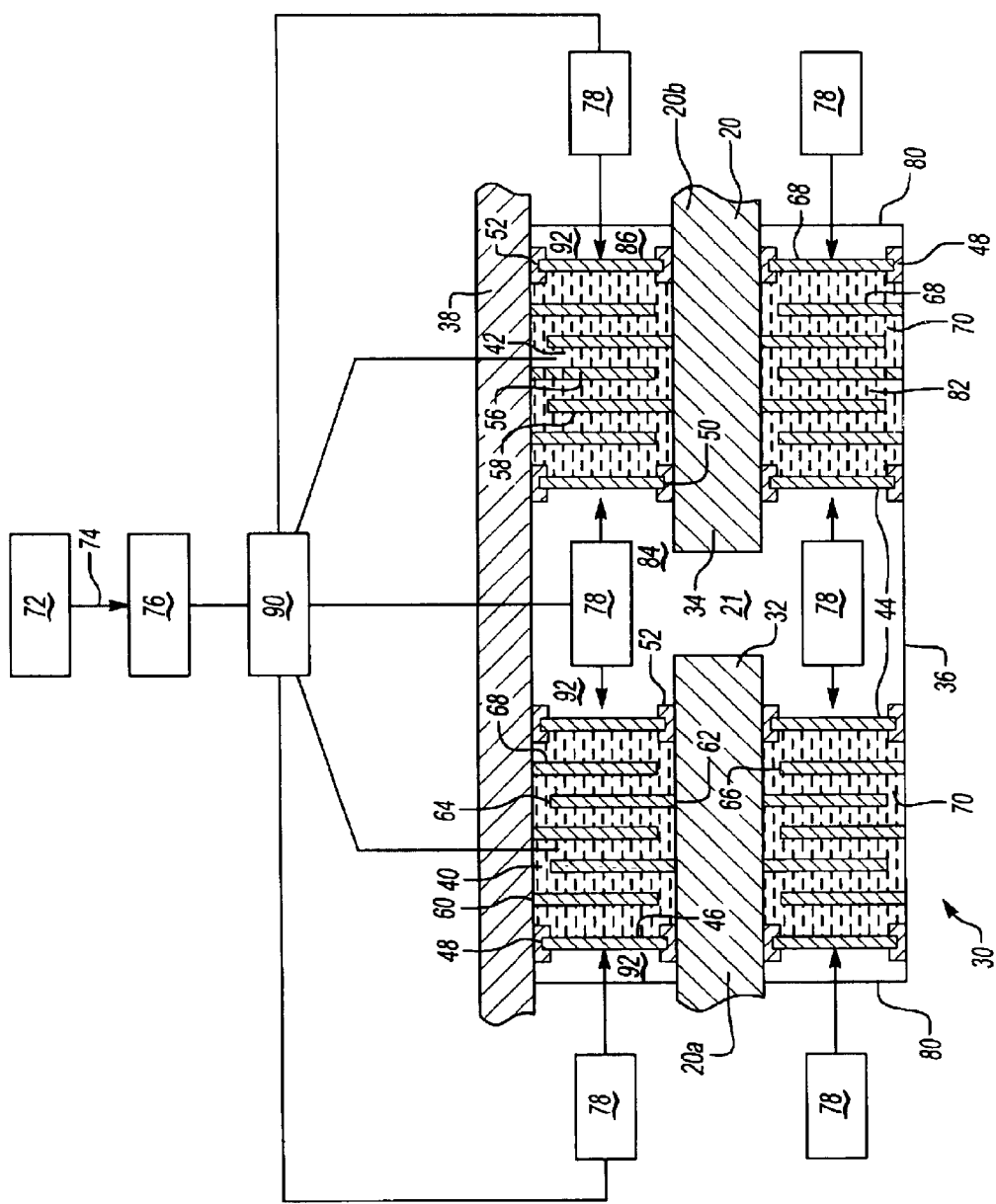
FIG. 3 illustrates a front cross-sectional view of a second embodiment of the clutch device utilizing magnetic-rheological fluid or electro-rheological fluid as the load source.

Alternatively, as illustrated in FIG. 3, an electro-rheological or magnetic-rheological fluid 92 is contained in the middle section 84 sand the outer sections 86. An electric or magnetic field, respectively, is generated by a field source 90. When stiffening is desired in the stabilizer bar 20, the controller 76 activates the field source 90 which generates a field that increases the viscosity or the fluid 92. As the fluid 92 thickens, load 78 presses on the walls 44 and 48, pressing the friction material 68 into contact. Additionally, the fluid 70 between the friction material 68 can also either be electro-rheological or magnetic-theological, which changes viscosity in response to an electric or magnetic field, respectively. The applied electric or magnetic field thickens the fluid, further increasing the stiffness of the stabilizer bar 20. The structure to create and apply the field source 90 may be as known, and a worker in the art would be able to develop an appropriate system.

Figure 4:
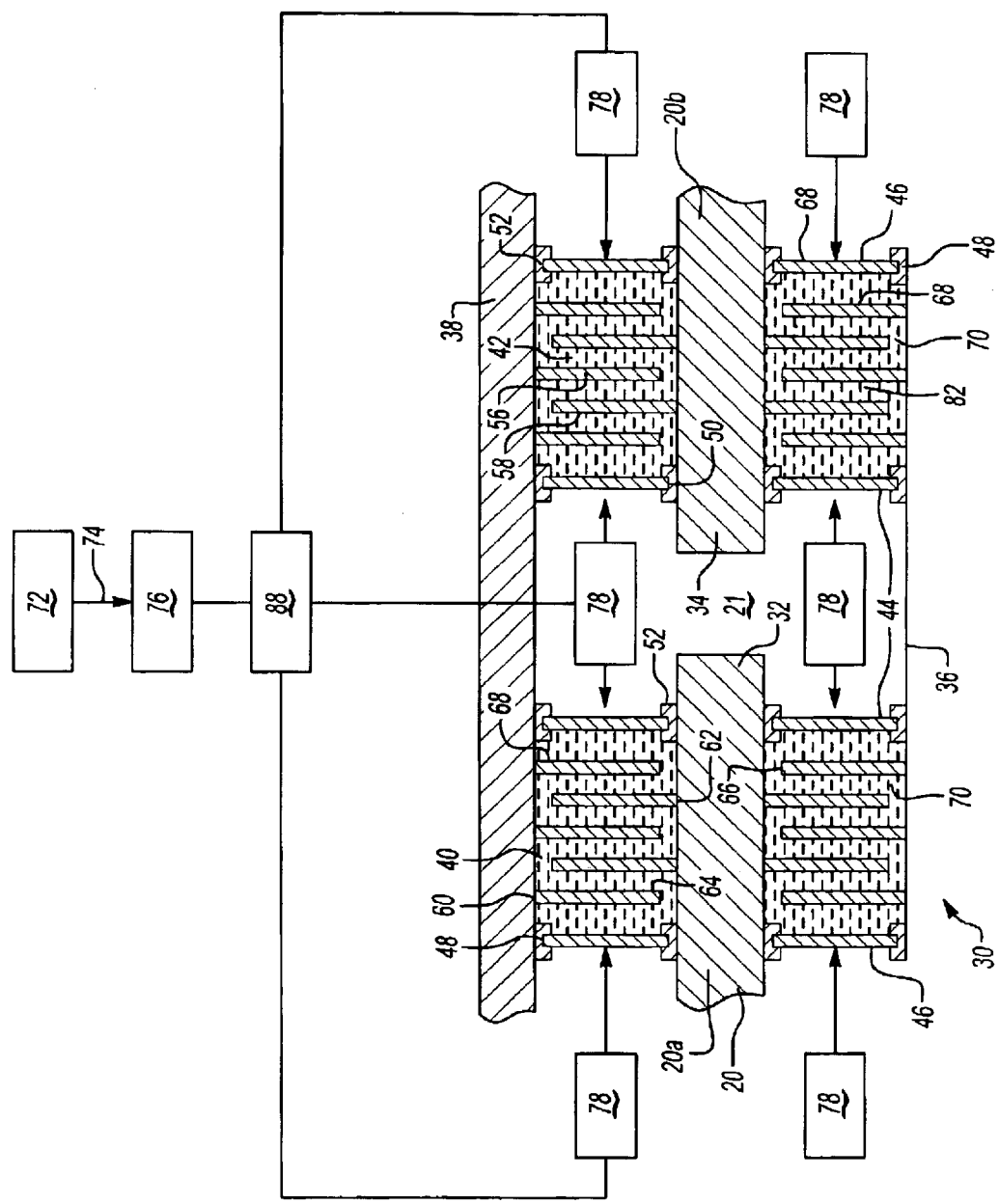
FIG. 4 illustrates a front cross-sectional view of a third embodiment of the clutch device utilizing an electrical load source.

FIG. 4 illustrates a third embodiment of the present invention. The load 78 is generated by an electrical source 88, shown schematically. The load 78 is applied to the walls 44 and 46, pressing the friction material 68 into contact to stiffen the stabilizer bar 20. Again, the electrical details necessary are within the level of skill in the art.

The clutch device 30 dampens or locks the stabilizer bar 20 depending on the required vehicle roll stiffness to prevent roll-over and to insure adequate handling. If the friction materials 68 are positioned apart, there will be low stiffness in the stabilizer bar 20 and a small amount of relative rotation between the stabilizer bar portions 20a and 20b. The ride of the vehicle will be soft and there will be relatively low suspension spring rate during bumps. If the walls 44 and 46 slide so as to cause the friction materials 68 to substantially contact, the stiffness of the stabilizer bar 20 increases and there will be no relative rotation between the stabilizer bar portions 20a and 20b. The ride of the vehicle will be relatively stiff and will have a relatively high suspension spring rate.

There are several advantages to utilizing the active clutched stabilizer bar 20. For one, as the stabilizer bar 20 is active, the roll stiffness of the stabilizer bar 20 can be continually modified to increase handling and also to avoid roll-over conditions. The stabilizer bar 20 provides additional roll stabilizer during extreme maneuvers and roll over conditions. The compliance of the stabilizer bar 20 can be adjusted to the actual conditions existing. The stabilizer bar 20 could have low compliance for normal driving, and a high compliance for cornering.

Accordingly, the present invention provides an active clutch device for use on a stabilizer bar of a vehicle suspension system to provide variable stiffness in the stabilizer bar.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A vehicle suspension system comprising:
   a stabilizer bar including at least one bar damper, and said stabilizer bar being connectable to a vehicle wheel; and
   a clutch device substantially housing said at least one bar damper and including at least one clutch damper that is connectable to a vehicle frame, one of said at least one bar damper and said at least one clutch damper is movable relative to the other to control a level of stiffness of said stabilizer bar.

2. A vehicle suspension system comprising:
   a stabilizer bar including at least one bar damper, and said stabilizer bar being connectable to a vehicle wheel;
   a clutch device substantially housing said at least one bar damper and including at least one clutch damper that is connectable to a vehicle frame, one of said at least one bar damper and said at least one clutch damper is moveable relative to the other to control a level of stiffness of said stabilizer bar, and
   a friction material coated on at least one of said at least one clutch damper and said at least one bar damper.

3. The vehicle suspension system as recited in claim 2 wherein increased contact of each of said at least one clutch damper and said at least one bar damper with said friction material substantially increases said level of stiffness of said stabilizer bar.

4. The vehicle suspension system as recited in claim 2 wherein said at least one clutch damper, said at least one bar damper and said friction material are enclosed by at least a pair of outer walls flexibly secured to a clutch body of said clutch device and to said stabilizer bar.

5. The vehicle suspension system as recited in claim 4 wherein a load applied on said pair of outer walls presses said pair of outer walls towards said at least one clutch damper and said at least one bar damper such that said friction material substantially contacts said at least one clutch damper and said at least one bar damper.

6. The vehicle suspension system as recited in claim 5 wherein a fluid is dispersed in said clutch body.

7. The vehicle suspension system as recited in claim 5 further including a sensor that monitors at least one ride parameter and generates a signal based on said at least one ride parameter, and said signal causes said load to be applied on said pair of outer walls, said load corresponding to said signal.

8. The vehicle suspension system as recited in claim 5 wherein said load is applied by a fluid.

9. The vehicle suspension system as recited in claim 5 wherein said load is applied from electrical power.

10. The vehicle suspension system as recited in claim 5 further including a sensor and wherein said load is applied from an electro-rheological fluid reactive to a signal generated by said sensor.

11. The vehicle suspension system as recited in claim 5 further including a sensor and wherein said load is applied from a magnetic-rheological fluid reactive to a signal generated by said sensor.

12. The vehicle suspension system as recited in claim 1 wherein there are a plurality of said at least one clutch damper and a plurality of said at least one bar damper, said plurality of clutch dampers and said plurality of bar dampers substantially alternating.

13. The vehicle suspension system as recited in claim 2 wherein said at least one clutch damper said at least one bar damper and said friction material are substantially perpendicular to a longitudinal axis of said stabilizer bar.

14. The vehicle suspension system as recited in claim 1 wherein said stabilizer bar includes a division which splits said stabilizer bar into substantially equal portions, said clutch device housing said division.

15. A vehicle suspension system comprising:
   a stabilizer bar including at least two bar dampers, wherein said stabilizer bar is connectable to a vehicle wheel;
   a clutch device substantially housing said at least two bar dampers and including at least two clutch dampers that are connectable to a vehicle frame, and said at least two bar dampers substantially interact with said at least two clutch dampers to control a level of stiffness of said stabilizer bar;
   a pair of inner walls flexibly secured to a clutch body of said clutch device and to said stabilizer bar; and
   a pair of outer walls flexibly secured to said clutch body of said clutch device and to said stabilizer bar, wherein one of said pair of outer walls and one of said pair of inner walls forms a first compartment and the other of said pair of inner walls and the other of said pair of outer walls forms a second compartment, one of each of said at least two clutch dampers and said at least two bar dampers being enclosed in each of said first compartment and said second compartment, and a load applied on said pair of inner walls and said pair of outer walls presses said pair of inner walls outwardly and said pair of outer walls inwardly such that said at least two clutch dampers and said at least two bar dampers substantially contact.

16. A vehicle suspension system comprising:
   a stabilizer bar including at least one bar damper, and said stabilizer bar is connectable to a vehicle wheel;
   a clutch device including a clutch body, at least one clutch damper that is connectable to a vehicle frame, a pair of inner walls and a pair of outer walls both flexibly connected to said clutch body and said stabilizer bar, one of said pair of outer walls and one of said pair of inner walls forming a first compartment and the other of said pair of outer walls and the other of said pair of outer walls forming a second compartment, a fluid and said at least one clutch damper and said at least one bar damper being enclosed in said first compartment and said second compartment, said at least one bar damper substantially alternating with and interacting with said at least one clutch damper control a level of stiffness of said stabilizer bar; and
   a sensor which monitors at least one ride parameter and generates a signal based on said at least one ride parameter, said sensor causing a load to be applied on said pair of inner walls and said pair of outer walls to press said pair of inner walls outwardly and said pair of outer walls inwardly such that said at least one clutch damper and said at least one bar damper substantially contact.

17. The vehicle suspension system as recited in claim 16 further comprising a friction material coated on said at least one bar damper and said at least one clutch damper, and wherein increased contact of each of said at least one clutch damper and said at least one bar damper with said friction material substantially increases said level of stiffness of said stabilizer bar.

18. The vehicle suspension system as recited in claim 16 wherein said stabilizer bar includes a division which splits said stabilizer bar into substantially equal portions, said clutch device housing said division.

19. The vehicle suspension system as recited in claim 16 wherein said at least one clutch damper comprises at least two clutch dampers and said at least one bar damper comprises at least two bar dampers, one of each of said at least two clutch dampers and said at least two bar dampers is enclosed in each of said first compartment and said second compartment.

20. The method for controlling a level of stiffness of a stabilizer bar of a vehicle suspension system comprising the steps of:

sensing at least one ride parameter;

generating a signal based on said at least one ride parameter;

applying a load corresponding to said signal on a pair of inner walls and a pair of outer walls both flexibly connected to a clutch body of a clutch device and to said stabilizer bar, one of said pair of outer walls and one of said pair of inner walls forming a first compartment and the other of said pair of inner walls and the other of said pair of outer walls forming a second compartment; and interacting at least two bar dampers attached to said stabilizer bar and at least two clutch dampers attached to said clutch device, one of each of said at least two bar dampers and said at least two clutch dampers being located in each of said first compartment and said second compartment, by said load to control said level of stiffness of said stabilizer bar.

21. A vehicle comprising:

a stabilizer bar including at least one bar damper, said stabilizer bar being connected to a vehicle wheel; and a clutch device substantially housing said at least one bar damper and including at least one clutch damper connected to a vehicle frame, at least one of said at least one bar damper and said at least one clutch damper moving to control a level of stiffness of said stabilizer bar.

* * * * *

UNITED STATES PATENT AND TRADEMARK OFFICE
CERTIFICATE OF CORRECTION

PATENT NO.    : 6,811,166 B2
DATED         : November 2, 2004
INVENTOR(S)   : Carlstedt et al.

It is certified that error appears in the above-identified patent and that said Letters Patent is hereby corrected as shown below:

Column 6,
Line 49, please insert -- to -- after "damper" and before "control".
Line 43, "outer" should read as -- inner --.

Signed and Sealed this

Twenty-second Day of February, 2005

JON W. DUDAS
*Director of the United States Patent and Trademark Office*